Sept. 16, 1952 J. L. MURRAY 2,610,764
PRESSURE COOKING DEVICE
Filed June 13, 1945 3 Sheets—Sheet 3
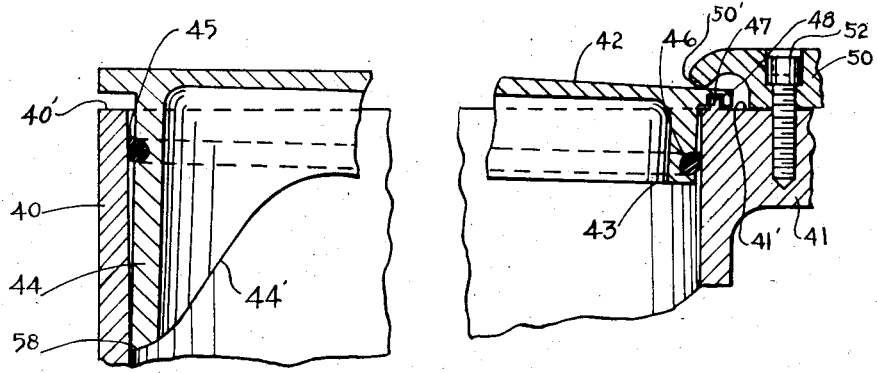
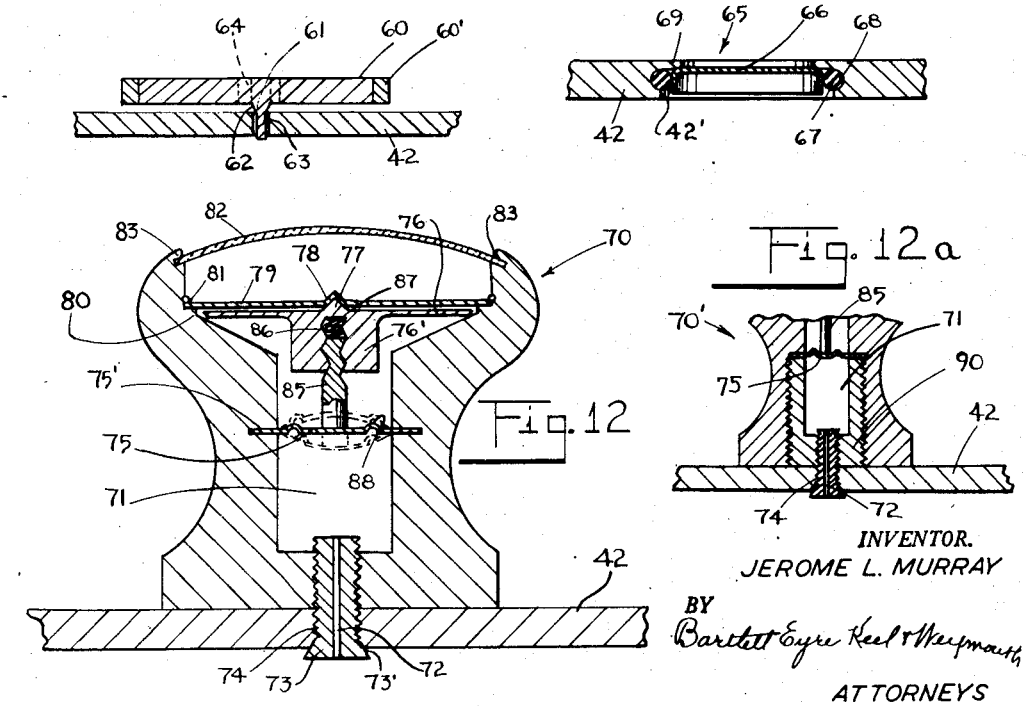
INVENTOR.
JEROME L. MURRAY
BY Bartlett Eyre Keel & Weymouth
ATTORNEYS Patented Sept. 16, 1952

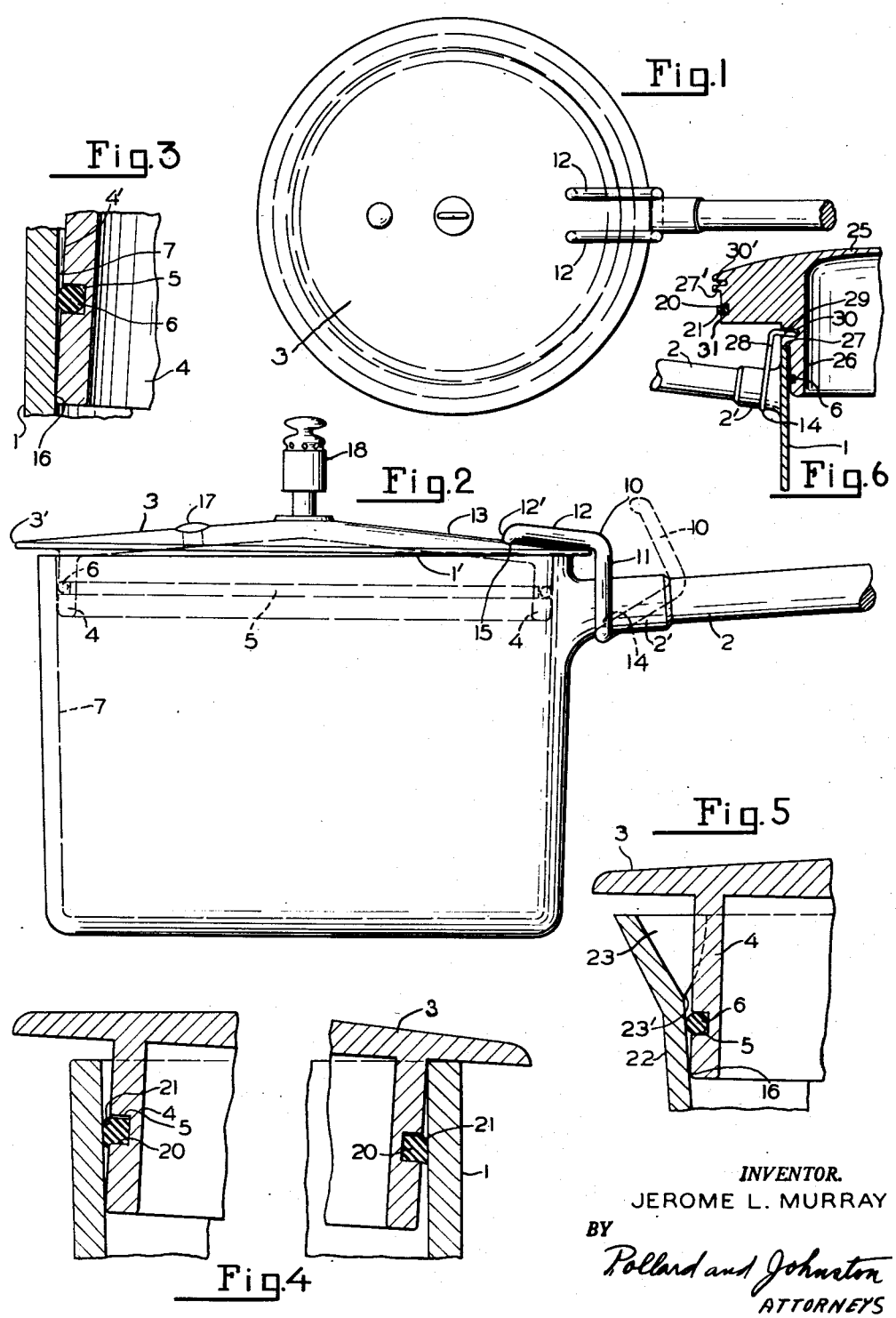

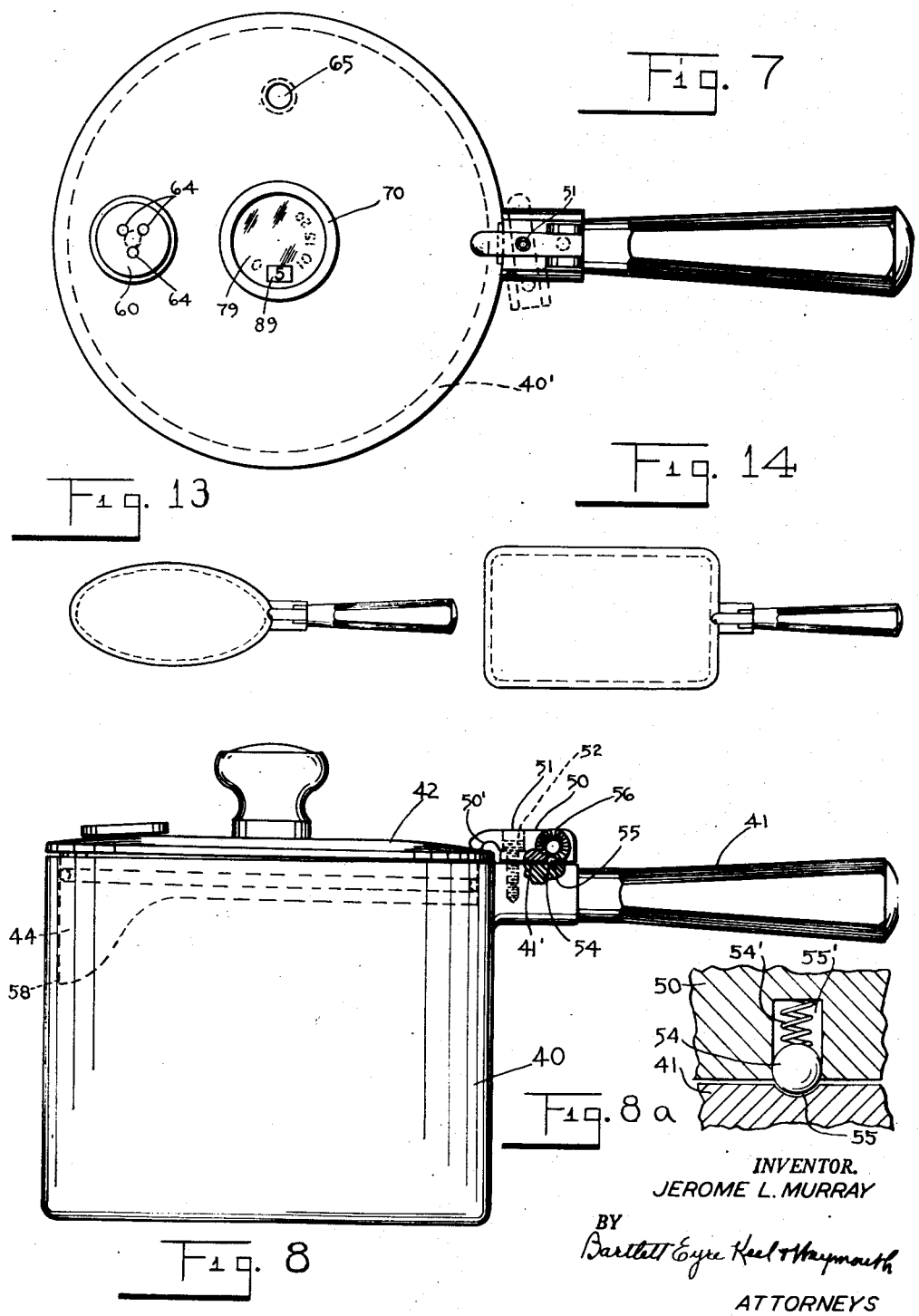

2,610,764

UNITED STATES PATENT OFFICE 2,610,764

PRESSURE COOKING DEVICE

Jerome L. Murray, New York, N. Y.

Application June 13, 1945, Serial No. 599,263

6 Claims. (Cl. 220—55)

This invention relates to pressure cookers and the like.

One object of the invention is a novel and improved pressure cooker which is characterized by its simplicity in construction and manipulation and by the economy with which it may be manufactured.

A further object of the invention is a pressure cooker of the above indicated character whose operation is characterized by minimum food contamination by the material of sealing means, by the ready cleaning and replaceability of the sealing means, and by the simplicity with which the closure may be held on the pressure pot or vessel against pressures therewithin.

A further object of the invention is a novel and improved pressure cooker wherein the closure is so constructed as to be retained in closed sealing position by a retaining means pivotally engaging one side of the closure and by the opposite side of the closure assuming a tilted position to bind against the interior of the receptacle and thereby cause the binding action to oppose the lifting action of the pressure.

A further object of the invention is a novel and improved pressure closure which is characterized by the readiness with which it may be adapted to and used with conventional cooking pots and vessels.

Other objects of the invention will hereinafter appear.

For a better understanding of the invention, reference may be had to the accompanying drawings forming a part of this application, wherein—

Fig. 1 is a top view of a pressure cooker embodying the invention;

Fig. 2 is a side view thereof;

Fig. 3 is a fragmentary sectional view;

Fig. 4 is a fragmentary sectional view of a modification with certain parts omitted;

Fig. 5 is a fragmentary sectional view of another modification with certain parts omitted;

Fig. 6 is a fragmentary sectional view of another modification with certain parts omitted;

Fig. 7 is a plan view illustrating another modification;

Fig. 8 is an elevational view thereof;

Fig. 8a is a sectional view illustrating the ball lug 54, 55.

Fig. 9 is a fragmentary sectional view of a part of the casing;

Fig. 10 is a fragmentary sectional view of the safety valve means;

Fig. 11 is a fragmentary sectional view of a safety fuse means;

Fig. 12 is a sectional view of the pressure gauge unit;

Fig. 12a is a modification of the pressure gauge unit;

Fig. 13 is a plan view of an oval shaped unit embodying the invention;

Fig. 14 is a plan view of a four-sided unit embodying the invention.

Referring to the drawings, I have illustrated my invention as embodied in a pressure cooking pot or vessel of conventional cylindrical form indicated at 1 and having a suitable handle 2 fastened to one side thereof adjacent the top of the vessel 1. The closure for the vessel 1 comprises a cover 3 which engages or rests upon the rim 1' of the vessel and in the particular embodiment shown the cover 3 is made of larger diameter than the diameter of the vessel 1 with the periphery 3' of the disc projecting beyond the rim 1'. The closure also comprises a depending annular flange or skirt 4 integrally formed with or rigidly attached to the underside of the disc 3 and extending down into the vessel 1. This flange or skirt 4 has an external diameter which is slightly less than the diameter of the interior of the vessel 1 so as to fit loosely therein and to be capable of assuming a slight tilting position as shown in Figs. 2 and 3. This flange 4 is provided at a point intermediate its width and on the exterior thereof with a groove 5, this groove being in a plane parallel to the cover 3. In this groove is positioned a sealing ring 6 which may be of any conventional sealing ring material as, for example, rubber, rubber-like materials, compositions, etc. It is both compressible and resilient and is of a depth to project beyond the outer cylindrical surface 4' of the flange so as sealingly to engage the inner cylindrical surface 7 of the cooking vessel in both the non-tilted and tilted positions. In the particular embodiment shown the sealing ring 6 is of circular cross section but it may assume any desired or suitable form.

The closure also comprises a holding or retaining means 10 for pivotally engaging and holding the one side of the closing cover 3, namely the side adjacent the handle 2. This retaining means comprises a U-shaped part 11 straddling the part 2' of the handle and being disposed generally parallel with the side of the vessel 1. The sides of the U-part 11 are provided with integral continuations to form parallel holding and engaging arms 12 which engage the upper surface of the cover 3. In the particular embodiment these arms 12 form angles with the U-shaped part 11 slightly greater than a right angle so as to be disposed generally parallel to the upper surface 13 of the cover 3 which slopes upwardly at a small angle from the periphery 3' towards the center of the disc. The holder 10 is preferably provided with a means for anchoring it to the handle part 2' against slippage lengthwise of the latter, and this anchoring means comprises in the particular embodiment shown a transverse groove 14 formed on the under side of the handle part 2' for the reception and accommodation of the bottom of the U-shaped part 11 of the holder. Preferably also the holder is provided with means for anchoring the arms 12 to the upper surface 13 of the closing disc so as to prevent any tendency of the arms 12 to slip along the surface 13. For this purpose the cover 3 is provided on its upper surface 13 with two shallow recesses 15 within which are disposed bosses or the like formed on the arms 12. In the particular embodiment shown these bosses 12' are formed on the ends of the arms 12, the recesses 15 being positioned so as to accommodate and tend to hold the arms 12 in the holding position with the U-shaped part 11 straddling the handle part 2' and disposed in the groove 14. These recesses 15 may be circular grooves extending all the way around the surface 13, so that the cover can be fitted in any position within the 360°. The holder 10 is thus wholly detachably mounted, this holder being readily moved over as indicated in dotted lines in Fig. 2 to release the closure 3, 4 for removal from the vessel 1.

When it is desired to do pressure cooking it is only necessary to insert the closure 3, 4 on the vessel 1 with the flange or skirt 4 disposed within the vessel 1. With the cover 3 thus resting on the rim 1' of the vessel, the holding means 10 is then brought over to the position indicated in Figs. 1 and 2 with the U-shaped part 11 disposed in the groove 14 of the handle part 2' and the bosses 12' of the parallel arms 12 disposed in the recesses 15.

Figs. 2 and 3 show the approximate relative positions of the parts with a pressure above atmospheric within the vessel 1. The holder 10 holds one side of the closure either directly against or close to the rim 1' of the vessel 1 at a point adjacent the handle, but this holding is a pivot-like one permitting the closure to tilt upwardly about this point with the side diametrically opposite from the handle 2 being lifted until the peripheral edge 16 of the downwardly depending annular flange or skirt 4 engages the interior of the vessel 1 on that side. The closure is thus retained against the pressures within the cooker by the combined holding effects of the holder 10 and the binding of the opposite side of the flange or skirt 4 against the interior of the cooker with the binding action assuming the greater part of the load. This renders possible the use of the simple loosely mounted holder 10 which is required merely to assist in the tilting action. An effective seal is maintained at all times by the sealing ring 6 which is both compressible and resilient and is deep enough to project beyond the cylindrical surface 4' of the flange 4 so as to engage the wall of the pot. The sealing ring 6 is compressed against the interior of the vessel 1 when the closure is inserted upon and within the vessel. It is readily removable and replaceable by springing it out of the groove 5 when the closure is removed from the vessel. By this means impaired or worn out rings may be readily replaced. The sealing rings are not only readily replaceable but they are carried by the closure, instead of by the vessel 1 as in certain conventional structures, and accordingly when the closure is removed there is no rubber or like sealing means carried by the vessel to contaminate the food and the vessel 1 is easy to wash and clean, having no sealing grooves or seals carried thereby. The sealing ring 6 may be readily removed for cleaning the groove 5 and cleaning the sealing ring 6 if desired. The structure is further characterized by its marked simplicity and few parts. The holder 10 may be formed of bar or rod stock and may be cheaply formed. The closure with the disc and the flange 4 may be also inexpensively manufactured of metal or other suitable material. The closure combination may be manufactured and sold as separate units and used with conventional cylindrical cookers or pots 1. If the conventional cooker should not be provided with a groove 14 for the reception of the holder 10 such a groove may be easily formed by filing or the like therein.

At 17 I have indicated a safety plug for releasing excessive pressures and this may be a conventional rubber safety plug. At 18 I have indicated a conventional pressure release or regulator which may be provided if desired.

In the embodiment of Fig. 4 a different sealing ring 20 is shown. It embodies a generally rectangular cross-section and it has a wire 21 embedded in one corner thereof, namely the outside corner opposite the pressure side.

In the modification of Fig. 5 the invention is illustrated as applied to a vessel 22 having a pouring spout or lip 23. The skirt or flange 4 of the closure is thus relatively deeper than the flange of the modification of Figs. 2, 3 and 4 so as to bring the groove 5 and the sealing ring 6 down below the bottom 23' of the spout.

The embodiment of Fig. 6 is adaptable to different size pots or vessels 1 and in this particular embodiment the closure is designed for only two different size pots, as for example, pots of 10" diameter and 14" diameter. The closure comprises a lid or disc part 25 having a flange part 26 and a shoulder or lip part 27 resting on the rim of the pot 1. The holding means comprises a U-shaped part 28 which straddles the handle part 2' and is anchored lengthwise of the handle by being disposed in the groove 14 similarly to the modification of Figs. 1 and 2. The upper ends of the legs of the U-shaped part 28 are turned over at substantially right angles to form parallel arms 29 which in the operative position are disposed in a recess or groove 30 formed above the shoulder 27. The embodiment illustrated is the smaller diameter pot or vessel 1. For a pot of larger diameter, the closure is provided with a flange or straight edge 31 for fitting into a pot or vessel of that diameter and a shoulder or lip 27' is provided for resting upon the rim of the pot. A recess or slot 30' is provided above the lip or shoulder 27' for the reception of the bent arms 29 of the holder comprising the U-part 28 which engages the handle at the groove similar to the groove 14 of the larger pot. This has all the advantages in construction and operation above set forth with respect to the modifications in Figs. 1 to 5 and in addition has the advantage of being adaptable for use with different sized pots or vessels. The holder holds the closure at the side thereof adjacent the handle and the pressure created within the cooker tilts the closure 25 as described above so as to have the greater portion of the pressure inside of the cooker opposed by the binding action due to the tilting of the closure while the holder needs to exert merely sufficient pressure to cause the tilting and binding action under the influence of the pressure. The holder loosely and pivotally engages the closure so as to permit the tilting movement and is wholly removable for cleansing. The closure and holder are separate and form the whole closure combination which cooperatively functions with cookers of conventional cylindrical form.

In the embodiment of Figs. 7-9 I have illustrated the invention as embodied in a pressure cooking pot or vessel of conventional cylindrical form indicated at 40 and having a suitable handle 41 fastened to one side thereof adjacent the opening or top of the vessel 40. The closure for the vessel 40 comprises a disc or lid 42 which is adapted to rest on the periphery or rim 40' of the vessel. In this embodiment the disc or lid 42 is made of substantially the same diameter as the diameter of the pot 40. The closure or lid 42 carries underneath a cylindrical surface skirt 43 which is integrally formed with or rigidly attached to the underside of the disc 42. This cylindrical skirt 43 fits with a certain looseness or play inside the vessel 40 to provide for a slight tilting for binding against the interior of the pot, as for example, a play of .040 inch for a pot or vessel 40 of 7 inches diameter. This skirt is provided with a groove 46 formed in the outer surface thereof and surrounding the same, and in this groove is contained a suitable sealing ring 45, this sealing ring being of any suitable sealing material as, for example, rubber, rubber-like materials, compositions, etc. This sealing ring 45 is illustrated as of circular cross-section but it may be of any shape desired as, for example, of the character of the ring 20 shown in Fig. 4.

As shown in Fig. 9, the cross section of the sealing ring 45 has been converted by the pressure inside the vessel from the true circular section and in the particular embodiment shown, this ring is of a low durometer, which permits the extrusion of the same into tight sealing relation between the closing flange or skirt 43 and the interior of the vessel under the comparatively low pressure within the vessel. Such a low durometer sealing ring may be formed of sponge rubber and the like.

The cover or lid 42 may be applied to the vessel 40 with the periphery of the lid resting flat upon the rim 40' of the vessel only in one relative position and this position corresponds to that in which a lug 47 carried by the periphery or rim 40' of the vessel 40 rests within a corresponding recess 48 formed on the underside of the cover 42 near the periphery thereof. This lug 47 is disposed adjacent the inner part of the handle 41. With the disc or lid 42 thus alined and resting upon the rim 40' of the vessel 40, a holding or retaining means 50 may be manipulated to engage the upper surface of the lid in the vicinity of the recess 48 and lug 47. This holder or retaining means 50 is in the form of an elongated block which is pivotally fastened to the handle 41 at 51 and the pivotal fastening means is illustrated as a conventional screw pin which passes down through an opening formed in the holder and screw-threadedly engaging a correspondingly screw threaded recess formed in the upper side of the handle 41. This screw retaining member is provided with a conventional head 52 for engaging a corresponding shoulder formed about the opening in the holder. The upper surface of the handle 41 is formed with a flat upper surface 41' corresponding to the under flat surface of the holder 50. The holder 50 is provided with a finger 50' which when in the full line position shown in Fig. 7 engages the upper surface of the lid 42 at a point adjacent the periphery thereof and adjacent the lug 47. The dotted position in Fig. 7 shows the holder 50 and its holding finger 50' out of engagement with the cover or lid 42. The latter is provided with an upper surface which is downwardly inclined radially outward near the periphery thereof and accordingly the holder 50, may be freely actuated without the finger 50' engaging the extreme peripheral edge of the lid to move the finger to the retaining position shown in full lines in Figs. 7 and 8. In the particular embodiment shown, the rear end of the holding or retaining member 50 is provided on its under surface with a locking or retaining lug 54 (Fig. 7, 8a) which rests in a locking recess 55 on the flat surface 41', when the holder is in the position in alinement with the handle 41, to engage and hold the lid 42 on one side thereof. This lug 54 is shown in the form of a ball suitably held within but projecting out of a recess 55' into the recess 55 and being biased by a spring 54'. This facilitates the movements of the holder to and from retaining position. The holder 50 is provided with a pair of finger-engaging means 56 on the opposite sides thereof to facilitate the movement of the holder 50 in either direction about the pivotal axis 51 to operate the same to released and retaining positions and these finger engaging means 56 are preferably of heat-insulating material as, for example, a plastic material.

On the diametrically opposite side from the recess 48 the closing sleeve or skirt 43 is provided with a downwardly extending extension 44 so as to engage the inner surface of the pot 40 at a point 58 substantially below the periphery of the skirt at the diametrically opposite point and in the particular embodiment shown this extension tapers off from its lowest point 58 along the line 44' so as to cover only a small arc of the skirt. This limits the tilting movement of the cover or lid required to effect the sealing and holding function against the pressure in the vessel, with any given play between the skirt and the inner surface of the vessel, or with the same tilting movement angle this arrangement renders possible a larger play or difference in diameter of the skirt 43 with respect to the interior diameter of the vessel 40. This also saves metal in the cover or lid which may thereby be made of lighter weight.

This embodiment of the invention functions as described above with respect to the other embodiments. The lid or cover 42 is actually held in closing position against the pressure in the pot or vessel by the interior pressure itself acting to bind the cover in its tilted position with the retaining function carried largely by the binding action at the point 58, the holder or retaining means 50, in the main, functioning to hold the cover or lid in its tilted position so as to enable the retention of the cover or lid against the interior pressure by the binding action described. This simplifies the structure without sacrifice of safety against blowing off the lid.

In Fig. 10 I have illustrated my new and improved regulator for regulating the pressure. This comprises a disc weight 60 provided centrally with a supporting pin 61 carrying intermediate its length a conical valve 62. The latter is disposed in a correspondingly conical shaped valve seat at the upper end of an opening 63 leading through the cover or lid 42. The disc 60 is supported by the valve 62 slightly above the upper surface of the lid 42 and when the pressure exceeds that predetermined by the weight of the disc 60 the latter is lifted up with the escape of the vapor or steam past the valve 62 with a consequent lowering of the pressure inside the vessel or consequent prevention of a higher pressure. For facilitating the escape of the steam or vapor one or more openings 64 are provided in the disc 60 about the pin 61 which openings register with the valve chamber or opening 63 and provide for the free escape of the steam or pressure. In the particular embodiment shown there are three of these openings 64. There is a separate regulator 60 for each pressure to be maintained as, for example, 5 pounds, 10 pounds, 15 pounds etc. and they may be readily lifted off and replaced by other weights by simply lifting the valve 62 from the valve chamber 63 and reinserting another. A heat insulating ring 60' as for example of some suitable plastic is provided about the periphery of the disc 60 for facilitating removal of a weight without burning the fingers.

In Fig. 11 I have illustrated a safety fuse 65 disposed in an opening of the lid 42 for further protection against excessive and dangerous pressures inside the vessel. This is in the form of an inverted cup shape member 66 which is retained centrally of the opening by a sealing ring 67 disposed thereabout and contained in a retaining groove 68 formed in the wall or shoulder 42' on the underside of the lid. The opening is formed by a flange 69 forming a part of the lid 42 and against this circular flange 69 rests the bottom of the inverted cup shape fuse member 66 and accordingly the pressure inside the vessel tends to press this fuse member 66 tightly against the under surface of the flange 69. A tight seal is further maintained by the sealing ring 67 which may be of any suitable material such as rubber, rubber-like materials and compositions, with the pressure tending to spread out the ring body 67 to form a tight seal between the member 66 and the wall of the opening. The fuse member 66 may be of any suitable material as, for example, copper.

In Fig. 12 I have illustrated a novel and improved simple gauge structure forming a part of the knob or handle 70 for handling the cover or lid 42. This knob therefore forms the housing for the assembly of the gauge mechanism. This knob is provided with a pressure chamber 71 which communicates with the interior of the vessel through an opening 72 formed in a holding and retaining screw 73 which passes up through an opening 74 formed in the lid 42 and is screw-threadedly attached to the body 70 of the knob by means of a corresponding screw threaded opening leading to the pressure chamber 71. The head of the screw 70 is provided with a bevel or conical surface 73' cooperatively functioning with a correspondingly formed recess at the bottom of the opening 74 formed in the lid 42. By means of this screw the knob 70 is firmly fastened to the upper surface of the lid 42 in sealing relation against the escape of fluid pressure. The mechanism of the gauge includes a disc diaphragm 75 disposed across the chamber 71 with its periphery 75' embodied in the material of which the knob 70 is made, as for example a molded pastic material. By thus being embedded a perfect seal is formed against the pressure escaping around the edges of the diaphragm disc. The disc 75 is of any suitable material as, for example, copper bronze and is constrained to occupy one definite position when not under pressure. For example, it may be constrained to be in the lower broken line position shown in Fig. 12 when no pressure or appreciable pressure exists in the chamber 71, with the full line position corresponding to an intermediate pressure and the upper broken line position to a higher pressure. However, as the pressure gradually increases the central portion of the diaphragm disc 75 is moved upwardly as, for example, to the position shown in dotted lines and the movements of the central portion of this disc 75 are translated into movements of a scale disc 76 having suitable graduations or markings thereon to indicate the pressures. This scale disc 76 is provided with a centrally disposed centering conical guide 77 which is maintained as described below in a correspondingly shaped bearing 78 formed in a stationary disc 79. The disc 79 rests upon a shoulder 80 formed in the enlarged opening formed in the upper part of the knob 70 and this disc 79 is held in position by any suitable means as, for example, by a lock ring 81 disposed in a groove about the opening in the knob and engaging the upper surface near the periphery of the disc 79. A transparent window 82 is mounted within the opening in the upper part of the gauge 70, this transparent window having its peripheral edge disposed in a groove 83 formed in the upper part of the knob 70. In the particular embodiment shown the window glass 82 may be of Plexiglas which may be readily inserted and removed from the groove 83 to provide for the assembly of the disc 79, the scale disc 76 and other parts of the mechanism.

Any suitable mechanism for translating the diaphragm movements to the rotary scale disc 75 may be provided but I have illustrated a simple and improved mechanism comprising a screw threaded stem 85 which is attached to the central portion of the diaphragm 75 in any suitable manner and is cooperatively connected with the scale disc 76 by means of a spiral drive or screw transmission. For this purpose the scale disc 76 is provided on the underside with an enlarged part 76' and this portion 76' of the scale disc is provided with a central opening or recess 86 whose wall is provided with a high pitch screw transmission corresponding to a similar high pitch spiral or screw thread formed on the exterior of the outer end of the stem 85. In order to retain the disc 76 and its centering pivot 77 disposed in the bearing 78 a spring 87 is provided in the upper part of the recess 86 with one end engaging the upper wall of the recess and the other end engaging the end of the stem 85 so that irrespective of the position of the central portion of the diaphragm disc 75 the scale disc 76, 76' is retained in its uppermost position. But with up and down movements of the central portion of the diaphragm 75 corresponding to changes in pressure, corresponding but large angular movements are transmitted from the diaphragm to the scale disc 76. The stem 85 may be fastened to the central portion of the diaphragm 75 in any suitable manner as, for example, by welding. The diaphragm 75 is purposely diagrammatically illustrated and it is understood that it is of any conventional construction permitting the central portion to move up and down in response to pressures without interference with the anchoring of the peripheral edge of the diaphragm to the knob 70 in sealing relation. In the particular embodiment shown I have indicated an annular bead 88 formed therein to permit the movements of the central portion of the diaphragm without necessity of stretching the metal of the diaphragm. It is understood also that the high pitch spiral of the screw drive between the stem 85 and the member 76' is diagrammatically illustrated. The fixed disc 79 may be of any suitable material transparent or opaque and in the particular embodiment shown in Fig. 7 I have shown this disc as being opaque and having a suitable opening therein for registering with the numbers on the movable scale disc 76.

In the embodiment of Fig. 12a I have illustrated the chamber 71 as being formed in a separate removable plug 90 which is screwthreadedly attached to the open central lower portion of the knob 70' with the portion of the diaphragm 75 near the periphery thereof disposed between the upper end of this plug 90 and a shoulder formed in the main body of the knob 70. This renders possible the removal of the plug 90 with access to the diaphragm disc 75 and the removal of the same for replacement. In this case the diaphragm disc may be sealed firmly in position by plastic cement against the shoulder formed in the knob 70'.

In Figs. 1 to 9 the vessel and closure are shown of cylindrical shape. Fig. 13 shows the invention embodied in an oblong shaped vessel and Fig. 14 in a rectangular shaped vessel.

This application is a continuation in part of my application, Serial No. 531,528 filed April 17, 1944.

I claim:

1. In a pressure cooker, a cylindrical open top vessel having an inner cylindrical shape extending downwardly from the rim thereof, a closure for said vessel resting on the rim thereof and having a cylindrical closing surface disposed generally concentrically with the inner cylindrical surface of the vessel and loosely fitting and extending downwardly into said vessel said inner cylindrical surface being at least substantially coextensive with said cylindrical closing surface, said cylindrical closing surface having sealing means on the outer surface thereof for engaging and forming a tight seal with the interior of the vessel said vessel having means only on one side thereof and engaging only one side of said closure for holding the same upon the rim of the vessel but permitting tilting of the closure thereabout, said cylindrical closing surface being adapted upon tilting movement to bind against the interior of the vessel and thereby to hold the closure in position against the pressure inside the cooker.

2. In a pressure cooker having a cylindrical open top vessel having an inner cylindrical surface extending downwardly from the rim thereof and a handle fastened to the side wall of the vessel at a point adjacent the rim thereof, a closure for said cooker comprising a disc having a depending closing flange loosely fitting and extending down into said vessel and disposed generally concentrically with the inner cylindrical surface of said vessel, said inner cylindrical surface being at least substantially coextensive with said flange, said flange having a circular groove formed in the outer peripheral surface thereof in a plane intermediate the disc and the lower edge of the flange, a removable sealing ring disposed in said groove and projecting outwardly beyond the peripheral surface of the flange and sealingly engaging the interior of the vessel, and a U-shaped holding member on only one side of said vessel embracing said handle at a point adjacent the pot and having the legs thereof bent over at their ends and engaging only one side of the closure to hold one side thereof against the rim of the vessel with the opposite side of the closure being slightly tiltable responsively to the pressure within the vessel to cause the flange to bind against the interior of the opposite side of the vessel.

3. A pressure cooker comprising an open top vessel having an inner cylindrical surface extending downwardly from the rim thereof and having a handle fastened to the side wall thereof at a point adjacent the rim and projecting outwardly therefrom, a closure for said vessel having a closing flange loosely fitting and extending down into said vessel and disposed generally concentrically with the inner cylindrical surface of said vessel, said inner cylindrical surface being at least substantially coextensive with said flange, said flange having a groove formed on the outer surface thereof in a plane intermediate the width of the flange, a sealing ring disposed in said groove and projecting outwardly beyond the peripheral surface of the flange and sealingly engaging the interior of the vessel, and a holding device on only one side of said vessel comprising a U-part straddling said handle at a point adjacent the vessel and having the legs of the U bent over at substantially right angles and loosely engaging only one side of the closure to hold one side thereof upon the rim of the vessel, the side of the closure diametrically opposite the handle being held by the tilting action thereof and the binding of the flange against the interior of the vessel.

4. In a pressure cooker a cylindrical open top vessel having an inner cylindrical surface extending downwardly from the rim thereof having a handle fastened to the side wall thereof at a point adjacent the rim thereof and projecting outwardly therefrom, a closure for said vessel comprising a disc having a closing skirt loosely fitting and extending down into said vessel and disposed generally concentrically with the inner cylindrical surface of said vessel, said inner cylindrical surface being at least substantially coextensive with said skirt, said skirt having a compressible and resilient sealing ring on its outer periphery at a point intermediate the disc and the lower end of the skirt, said sealing ring projecting outwardly beyond the peripheral surface of the skirt and sealingly engaging the interior of the vessel, and an integrally formed holding member on only one side of said vessel comprising a U-part disposed in a groove formed on the underside of the handle at a point adjacent the point of fastening to the vessel and parallel arm parts turned at approximately right angles to the U-part and engaging the upper surface of the disc on only one side for holding the same, the other side of the closure being held by the tilting action of the closure and the binding of the flange against the interior of the vessel.

5. A pressure cooker of the character set forth in claim 1, having a closure for cylindrical open top cooking vessels of different diameters having radially spaced surfaces for supporting the closure upon a vessel, closing surfaces disposed adjacent said supporting surfaces and disposed at right angles thereto, said closing surfaces having circular grooves formed on the exterior surfaces thereof in planes intermediate the respective supporting surfaces and the lower edges of the closing surfaces, said grooves being adapted to receive sealing rings, and said closure having means on one side thereof for loosely attaching thereto a holder, said closure being slightly tiltable on the vessel to cause a corresponding closing surface to bind against the interior thereof.

6. In a pressure cooker, a vessel having a handle adjacent the rim thereof, a closing lid on said vessel, said lid having underneath a closing flange extending down into the vessel and having a clearance therewith permitting tilting of the lid with respect to the vessel, said closing flange carrying a sealing ring for engaging the interior surface of the vessel and sealing the same when the lid is tilted, said lid and vessel having aligning means preventing the lid resting upon the rim of the vessel except in a predetermined position, a single holder pivotally attached to said handle and adapted in one position to engage and hold one side of the lid, the flange having at the opposite side of the lid an extension so that when the lid is tilted under the influence of pressure and the holder, the lowermost edge of the extension is caused to engage the interior surface of the wall of the vessel with a binding and holding action, said flange extension being divergently tapered from the lowermost part thereof and said holder being provided with locking means between the holder and the handle when in a position to hold the lid, said lid being beveled off near its peripheral edge on its upper surface to facilitate the actuation of the holder into locking position and said means being disposed adjacent the holder.

JEROME L. MURRAY.

REFERENCES CITED

The following references are of record in the file of this patent:

UNITED STATES PATENTS

| Number | Name | Date |
| --- | --- | --- |
| 323,153 | Ives | July 28, 1885 |
| 352,609 | Dean | Nov. 16, 1886 |
| 1,265,676 | Klump | May 7, 1918 |
| 1,548,861 | White | Aug. 11, 1925 |
| 1,579,282 | Coughlin | Apr. 6, 1926 |
| 1,765,072 | Hashimoto | June 17, 1930 |
| 1,791,361 | Krause | Feb. 3, 1931 |
| 1,845,078 | Draper | Feb. 16, 1932 |
| 1,903,168 | Cordrey | Mar. 28, 1933 |
| 1,973,442 | Nelson | Sept. 11, 1934 |
| 2,153,807 | Kleinert | Apr. 11, 1939 |
| 2,303,359 | Hothersall | Dec. 1, 1942 |
| 2,436,407 | Stephens | Feb. 24, 1948 |